UNITED STATES PATENT OFFICE.

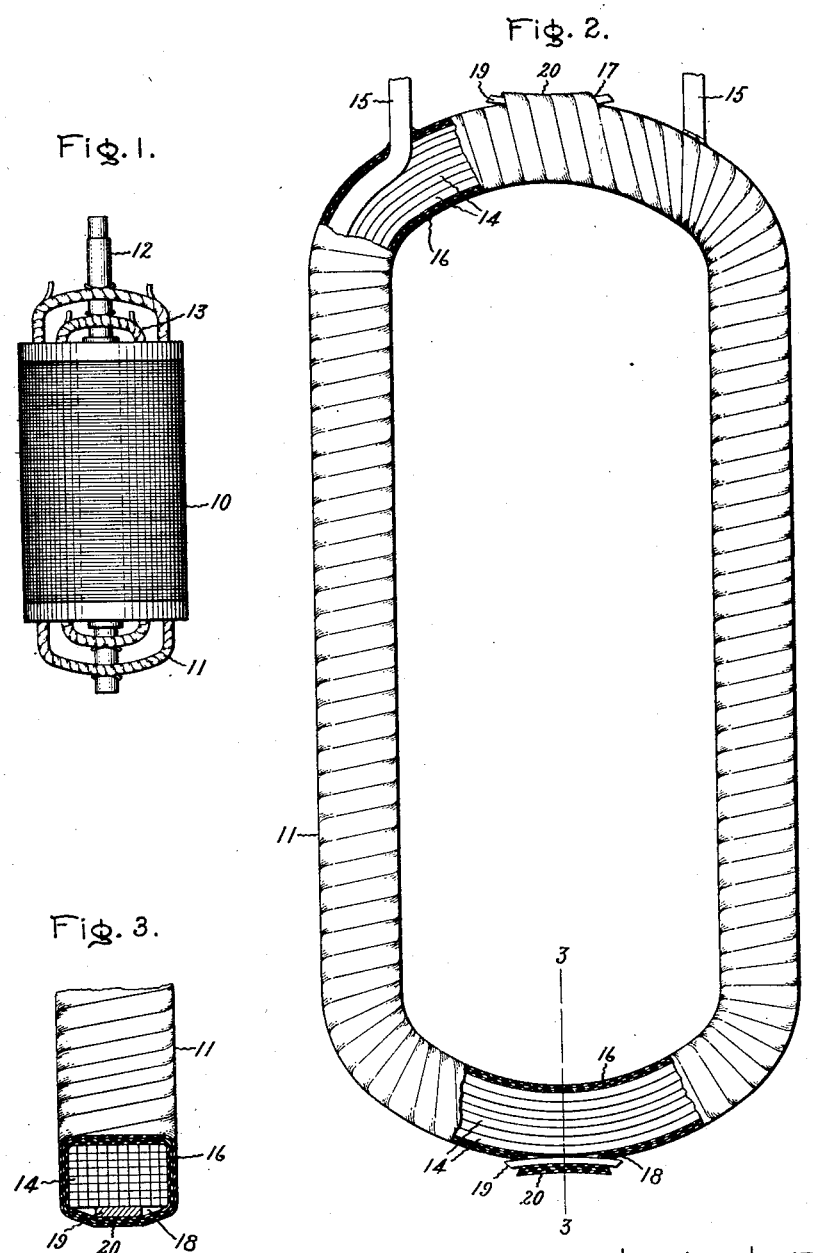

MAGNUS UNGER, OF PITTSFIELD, MASSACHUSETTS, ASSIGNOR TO GENERAL ELECTRIC COMPANY, A CORPORATION OF NEW YORK.

WINDING FOR ELECTRICAL APPARATUS.

1,362,375. Specification of Letters Patent. Patented Dec. 14, 1920.

Application filed July 16, 1918. Serial No. 245,248.

*To all whom it may concern:*

Be it known that I, MAGNUS UNGER, a citizen of the United States, residing at Pittsfield, in the county of Berkshire, State of Massachusetts, have invented certain new and useful Improvements in Windings for Electrical Apparatus, of which the following is a specification.

My invention relates to electrical windings for oil immersed electrical apparatus and has for its object the provision of means whereby the oil or other insulating fluid will thoroughly permeate the windings to improve the insulation and protect the windings in a more adequate manner than was heretofore known.

In the manufacture of windings for electrical apparatus, it has been customary to wind tape about the coils to provide insulation for the windings in addition to that on the windings themselves. When the coils have been taped, a coating of shellac or other suitable compound is applied to further increase the insulating properties of the windings. An insulating jacket of any desired dielectric strength is in this manner formed about the electrical conductors of the winding.

An insulating jacket formed in this manner is generally air tight, and as a certain amount of air is usually enveloped in the taping process it is desirable to dispel this air because of its known detrimental effects. Heating or baking the windings either before or after assembling them in the electrical apparatus has been resorted to, to dispel the moisture in the air from the windings with some measure of success, but such treatment is not productive of uniform or reliable results.

My invention, however, provides a more expeditious manner of dispelling substantially all the air from windings formed with insulating jackets or coverings thereabout, for I provide restricted openings which do not impair the insulating properties at a plurality of points in the insulating jacket through which openings the oil or insulating fluid surrounding the apparatus may permeate into the interior of the winding, dispel the air and improve the insulating qualities of the winding.

For a more complete understanding of the nature and objects of my invention reference should be had to the following detailed description when taken in connection with the accompanying drawing in which Figure 1 is a side elevation of a portion of an induction regulator provided with windings constructed in accordance with my invention. Fig. 2 is an enlarged side elevation, parts being broken away, of a winding embodying my invention; while Fig. 3 is a cross section taken on the line 3—3 in Fig. 2.

Referring now to the drawings, and particularly to Fig. 1, 10 denotes the laminated stator of an induction regulator having a winding 11 constructed to permit oil or insulating fluid to permeate interiorly thereof. 12 denotes the shaft for turning the rotor of the regulator, which rotor carries winding 13 constructed substantially similarly to coil 11.

The regulator here shown is to be immersed in oil or other insulating fluid held in a suitable container (not shown), such as a tank.

While I have here shown my improved winding as applied to an induction regulator, it is obvious that it may be applied to any form of electrical apparatus which is to be immersed in oil or insulating fluid.

In Fig. 2 I have shown in detail, a winding such as indicated at 11 or 13. This winding comprises coiled electrical conductors, shown at 14, provided with suitable leading in conductors 15.

The coiled conductors 14 are wrapped with one or more layers of insulating tape, shown in cross-section at 16; which tape may be coated or treated in any approved manner to increase the dielectric strength of the insulating jacket thus formed about the coiled conductors 14.

In order to permit the insulating fluid that surrounds the winding in operation, to permeate to the interior of the winding, I have formed restricted openings, at substantially opposite points in the winding, here shown as openings 17 and 18 located on the coils' longer axis of symmetry.

These restricted openings are made by removing the tape forming the enveloping jacket at the desired points and securing thereover an additional piece of insulating material which does not conform fully to the shape of the opening; the preferable mode of formation being to insert a strip of fiber or piece of press-board, such as shown at 19 at the point where the opening is to begin during the taping process, taping it on with a few turns of tape as indicated at 20, and subsequently winding on the tape as usual from the point where the opening is to end. While the restricted opening is thus preferably formed, it could be formed equally well, for the purpose of my invention, by cutting away the tape 16 at the points where the openings are desired, inserting a piece of press-board and securing the same by winding on a few turns of tape.

Still other ways of forming the restricted openings will occur to those skilled in the art; for instance, spongy material may be used instead of fiber or press-board.

When a coil of winding, such as I have shown in Fig. 2 is installed in a vertical operative position, as indicated in Fig. 1, (although such position is by no means essential in the practice of my invention), the surrounding insulating fluid permeates into the interior of the coil which increases its insulating qualities while the restricted nature of the openings 18 and 19 insure against any impairment of the insulating properties of the coil at these points.

The vertical position of the coils shown permits the force of gravity to assist the insulating fluid to permeate into all parts of the interior of the coils and to gradually displace and dispel substantially all the air or other gas enveloped in the winding during the taping process.

While I have here shown an embodiment of my invention which is, at present, the best means known to me for carrying the same into effect, I would have it understood that this is merely illustrative and that I do not mean to be limited thereby to the precise details here disclosed since obvious alterations thereof will appear to those skilled in this art, nor in the choice of recognized equivalents except as defined in my claims hereto annexed.

What I claim as new and desire to secure by Letters Patent of the United States, is:—

1. In an electrical apparatus, a winding comprising coiled conductors, and an insulating jacket enveloping said conductors, said insulating jacket being provided with restricted openings at a plurality of points, the openings being of a character such that the insulating qualities of said jacket are unimpaired.

2. In an electrical apparatus, a winding comprising coiled conductors, and an insulating jacket enveloping said conductors, said insulating jacket being provided with openings at a plurality of points having an additional piece of insulating material secured thereover.

3. In an electrical apparatus, a winding comprising coiled conductors, and an insulating jacket enveloping said conductors, said insulating jacket being provided with openings at a plurality of points having a strip of insulating material secured thereover with insulating tape.

4. In an electrical apparatus, a winding comprising coiled conductors, and an insulating jacket enveloping said conductors, said insulating jacket being formed of insulating tape and provided with openings at a plurality of points having a strip of insulating material taped thereover with a few turns of tape.

5. In electrical apparatus immersed in insulating fluid, a winding comprising coiled conductors, and an insulating jacket enveloping said conductors, said insulating jacket being provided with a plurality of restricted openings which permit the insulating fluid to permeate into the interior of said winding and dispel air.

6. In electrical apparatus immersed in insulating fluid, a winding comprising coiled conductors, and an insulating jacket enveloping said conductors, said insulating jacket being provided with a plurality of openings having pieces of insulating material secured thereover without conforming to the shape of the opening, whereby the insulating fluid permeates the interior of said winding and dispels air.

7. In electrical apparatus immersed in insulating fluid, a winding comprising coiled conductors, and an insulating jacket enveloping said conductors, said insulating jacket being provided with a plurality of openings, each having a strip of insulating material secured thereover with a few turns of insulating tape, whereby the insulating fluid permeates the interior of said winding and dispels air.

8. In electrical apparatus immersed in insulating fluid, a winding comprising coiled conductors, and an insulating jacket enveloping said conductors, said insulating jacket being formed of insulating tape and provided with a plurality of openings located at substantially opposite points, each opening having a strip of insulating material secured therein with a few turns of tape, whereby the insulating fluid permeates the interior of said winding and dispels air.

In witness whereof I have hereunto set my hand this 26th day of June, 1918.

MAGNUS UNGER.